(12) United States Patent
Zheng et al.

(10) Patent No.: US 8,517,182 B2
(45) Date of Patent: Aug. 27, 2013

(54) REFLUX BACKWASHING MECHANISM FOR AUTOMATIC FLUID FILTRATION

(75) Inventors: Ye Zheng, RuiAn (CN); Peng Zheng, RuiAn (CN)

(73) Assignee: Ye Zheng, RuiAn (CN)

( * ) Notice: Subject to any disclaimer, the term of this patent is extended or adjusted under 35 U.S.C. 154(b) by 45 days.

(21) Appl. No.: 13/380,040

(22) PCT Filed: Aug. 23, 2010

(86) PCT No.: PCT/CN2010/076234
§ 371 (c)(1),
(2), (4) Date: Dec. 22, 2011

(87) PCT Pub. No.: WO2011/035669
PCT Pub. Date: Mar. 31, 2011

(65) Prior Publication Data
US 2012/0103894 A1    May 3, 2012

(30) Foreign Application Priority Data
Sep. 28, 2009  (CN) .......................... 2009 1 0307843

(51) Int. Cl.
*B01D 29/68* (2006.01)
*B01D 29/94* (2006.01)

(52) U.S. Cl.
USPC ........... 210/355; 210/304; 210/308; 210/313; 210/320; 210/333.1; 210/411

(58) Field of Classification Search
USPC ................. 210/304, 308, 313, 320, 411, 355, 210/333.1
See application file for complete search history.

(56) References Cited

U.S. PATENT DOCUMENTS

| 4,059,518 | A | * | 11/1977 | Rishel | 210/108 |
| 4,781,825 | A | * | 11/1988 | Grimes et al. | 210/107 |
| 6,596,165 | B2 | * | 7/2003 | Koivula | 210/323.2 |
| 6,827,864 | B2 | * | 12/2004 | Kangasniemi et al. | 210/791 |

FOREIGN PATENT DOCUMENTS

| CN | 101024130 | | 8/2007 |
| CN | 101658741 | | 3/2010 |
| CN | 201516309 | | 6/2010 |
| CN | 101785938 | A * | 7/2010 |

OTHER PUBLICATIONS

International Search Report of PCT Application No. PCT/CN2010/076234, Nov. 11, 2010.

* cited by examiner

*Primary Examiner* — Thomas M Lithgow

(57) ABSTRACT

A reflux backwashing mechanism for automatic fluid filtration, includes a hollow shaft sleeve (12) is located inside of the fluid inversion chamber (2); a blade (11) and a baffle plate (10) are connected with the hollow shaft sleeve (12) which is provided with an opening (9) at a position of the lower part of the baffle plate (10); a hollow core shaft (13) with an upward opening is located inside of the hollow shaft sleeve (12); and the shaft wall of the hollow core shaft (13) is distributed with through holes (14); and the hollow core shaft (13) is installed on an upper baffle plate (4).

7 Claims, 2 Drawing Sheets

REFLUX BACKWASHING MECHANISM FOR AUTOMATIC FLUID FILTRATION

FIELD OF THE PATENT APPLICATION

The present patent application relates to a reflux backwashing mechanism for automatic fluid filtration, such as automatic filtration of air and water with reflux backwash and purification. The present patent application particularly relates to a reflux backwashing mechanism for automatic fluid filtration involving air filtration, mechanical filtration and fuel filtration devices for mechanics of automobiles and ships.

BACKGROUND

Prior arts in fluid filtration are abundant and vast yet are all ordinary filtration blocking type devices. As they lack backwash function, increased rounds of filtration will increase blockage, and fluid will not be able to pass through as filtration accumulates. Hence, the machine will need to be stopped and be removed or replaced with a filtration core. This kind of working mode can no longer achieve successfully in the filtration mission on current mobility or machines. Traditional automatic filtration mechanisms that use mechanical or electrical signal to control backwash function are complex in assemblage and expensive in cost. Even though many medium to low capacity diesel engines may want to be applied with such mechanisms, when taking into account the cost and nature of the device, they may only abandon the utilization. In overcoming the above-mentioned defects, the inventor of the present application has invented an 'Automatic purifying energy-saving filter' in 2007 with Chinese patent application no. 200710066624.3. Basically the patent application has met the need of automatic filtration of fuels of the diesel engines. Through experimental uses in recent years, it is discovered that the fluid inversion structure of existing patent application still contains defects, wherein the speed and stability of fluid inversion body is low and insufficient, respectively. Further, the use scope is only limited to the automatic filtration of fuels of diesel engines. As the spinning of fluid inversion is not depended on any core shaft, collision with the surroundings occurs during the spinning and friction force is large without application of reflux back force washing power, thus affecting the stability of the work and frequency of the fluid inversion body spinning.

SUMMARY

In order to solve the existing problem of the present technology, the present patent application seeks to solve the technical problem by providing an automatic filtration mechanism with higher efficiency which can adapt to the needs of different fluid automatic filtration and filtrate particle of less than 5 micron, and utilizes the fluid forward and backward flow energy and maintain reliable and stable work.

To achieve and realize the objective, the present patent application utilizes the following technical solution: The reflux backwashing mechanism for the fluid automatic filtration includes an upper housing and a lower housing that are installed together. The upper housing includes a fluid import and a back flow export mouth. The interior of the upper housing and lower housing contain an upper baffle plate. Directional pores are located on top of the baffle plate. The directional pores are inter-connected to the interior of the upper and lower housing. The interior of the upper housing contains a fluid inversion chamber. The interior of the fluid inversion chamber contains a spin able blade and baffle plate. The interior of the lower housing contains at least two filtration cores. The upper opening of the filtration core and the pore of the upper baffle plate correspond. The interior of the lower housing contains a lower baffle plate. Impure oil pores are located on the lower baffle plate. The impure oil pores and the lower opening of the filtration core correspond, whose characteristic lies in that a hollow core shaft sleeve is located inside the fluid inversion chamber. The blade and the baffle plate are connected to the hollow core shaft sleeve. The hollow shaft sleeve located at the lower part of the baffle plate contains an opening. The interior of the hollow shaft sleeve contains an upward opening hollow core shaft. The shaft wall of the hollow core shaft is distributed with pores. The hollow core shaft is installed on top of the upper baffle plate.

The pores on the upper baffle shaft are divided into two sections which are inter-connected together. The upper section pores are slanted in position relative to the lower section pores, which is basically consistent with the fluid flow direction inside the fluid inversion chamber.

The hollow shaft sleeve contains a heavy balanced block, which is installed on the hollow core shaft. The heavy balanced block can allow the top and bottom of the fluid inversion body to closely adhered to the oil film on the baffle plate while its surrounding bottom part is spinning.

The exterior of the filtration core frame contains revolving metal wires that are top and bottom overlapped. A gap is found between each metal wire which allow the fluid to pass through.

The fluid entry mouth is tangentially positioned in the interior wall of the housing.

Compared with the existing technology, the beneficial results of the present patent application are: the fluid inversion body of the present patent application contains multiple evenly distributed blades. Directional pores with angles are mounted on the upper baffle plate and can fully utilize the fluid which are in forward flow and exit from the slant positioned directional pores to produce a back flow and back wash momentum force. Such momentum force would cause the fluid and blade to change direction and produce a combined force to increase the frequency of the spinning of the fluid inversion. As the blade and the baffle plate can depend on the core shaft to spin, the rotation can be more stable without the friction force produced by the blade and the baffle plate towards the interior of the housing wall. Hence, the whole system can be safe and dependable and enhance the automatic filtration result. In addition, as the directional place for oil to enter has been changed from the top of the fluid inversion body to the interior tangential of the housing wall, which is also the tangential direction of the housing, a huge momentum force will be produced when the fluid enters the oil pores and would stimulate the blade to spin and provide the maximum flow energy from the fluid inversion spinning Hence, the working stability and dependability and spinning frequency of the fluid inversion can be greatly enhanced, and an effective result can be achieved.

BRIEF DESCRIPTIONS OF THE DRAWINGS

DETAILED DESCRIPTION

Figure 1:
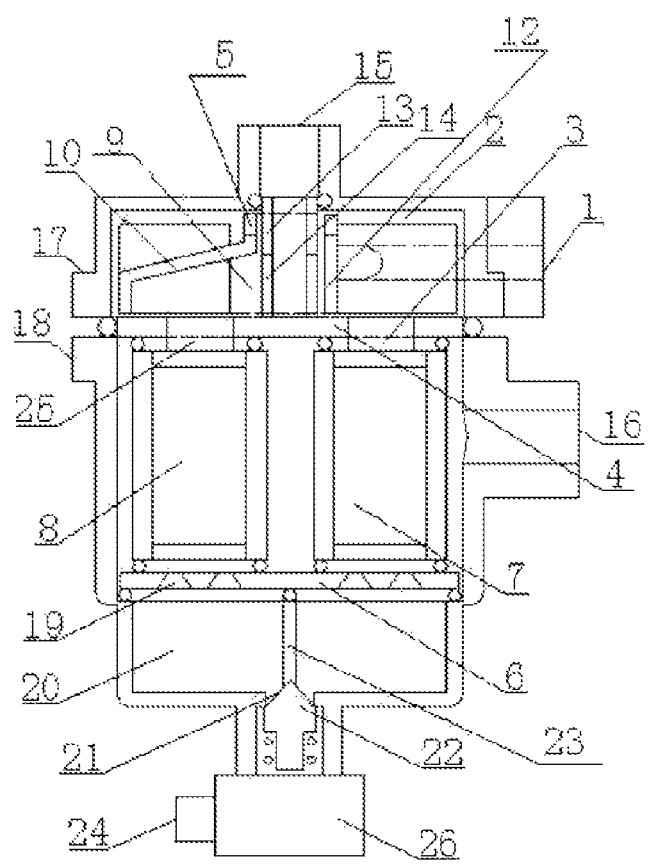
FIG. 1 illustrates the structure of the present patent application.
Figure 2:
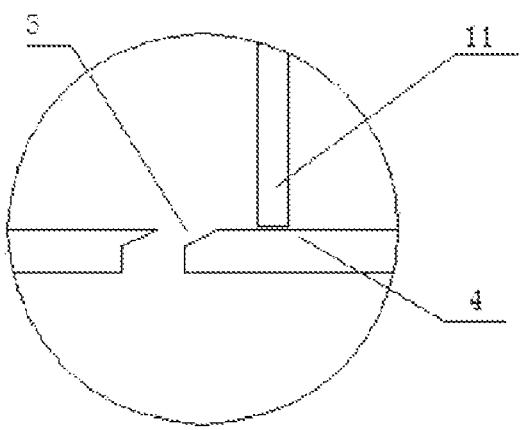
FIG. 2 is a view of the upper baffle plate.

The drawing illustrates the structure of the present patent application. The following takes two filtration cores as an example to further describe the embodiment in detail along with the drawing. FIG. 1 illustrates a reflux backwashing mechanism for automatic fluid filtration. The reflux backwashing mechanism for automatic fluid filtration includes an upper housing 17 and a lower housing 18 that are installed together. The interior of the upper housing 17 contains a fluid inversion chamber 2. The interior of the fluid inversion chamber 2 includes a rotatable blade 11, baffle plate 10 and a hollow shaft sleeve 12. The blade 11 and the baffle plate 10 are connected to the hollow shaft sleeve 12 as a single body, called a fluid inversion body. The upper housing 17 includes a back flow exit mouth 15 and tangential positioned fluid inflow mouth 1. As the inflow mouth 1 is tangentially positioned, the tangential momentum of the fuel can produce the maximum reverse torque, and impact the blade 11. The interior of the upper housing 17 and lower housing 18 contain an upper baffle plate 4. Directional pores 3 and 25 are situated on the upper baffle plate 4. The directional pores 3 and 25 are inter-connected to the interior of the upper and lower housing. The directional pores 3 and 25 are divided into two sections and are inter-connected. The upper pores are positioned in slanted direction relative to the lower pores. Those slanted direction and fluid flow direction inside the fluid inversion chamber are basically consistent. The directional pores 3 and 25 can prevent the fuel that are pumped into the filtration cores 7 and 8 from causing an impact on the core wall. When oil returns to the fluid inversion chamber 2, the filtration core would produce a back flow impact force due to the slanted pores, causing blade 11 and baffle plate 10 to spin in one direction at high speed and allows the fuel in the fluid inversion chamber 2 to produce a spinning force. When the blade 11 inside the fluid inversion chamber 2 is quickly spinning in a single direction towards the right side lead by the fuel, and then is spinning towards the left side in one complete rotation, a result wherein a positively directed filtration from outside to inside and a back wash of the eye net from outside to inside can be achieved for the left and right stable and fixed filtration cores 7 and 8. Hence, particles and impurities of fuel cannot be easily remain inside the eye net and will gradually sink towards the bottom relative to the law of gravity. The interior of the hollow core shaft sleeve 12 contains upward opened hollow core shaft 13. Pores 14 are located on the shaft wall of the bottom of the hollow core shaft. The hollow shaft sleeve at the bottom of the baffle plate contains an opening 9. Two filtration cores 7 and 8 are situated inside the lower housing 18. The upper opening of every filtration core and directional pore of the every upper baffle plate 4 correspond. The hollow core shaft 13 is connected to the top of the upper baffle plate 4. The lower baffle plate 6 is located inside the lower housing 18. Impure oil pores 19 are situated on top of the lower baffle plate 6. The impure oil pores 19 and the lower opening of the filtration core correspond. Impure oil chamber 20 is located at the bottom of the lower baffle plate. The sinking particles or impurities can enter into the impure oil chamber 20 through impure oil pores 19. The impure oil chamber has closed field plate 23, causing the impure oil chamber that corresponds to the individual filtration core to be unable to exchange. The bottom of the closed field plate 23 contains discharge pores 21, which is sealed by a top pin 22. When a need to discharge arises, the electromagnetic valve 26 moves in a way that lead the top pin to move downward. Discharge pores 21 open and allows impure oil to discharge through the exit mouth 24. If gas is being filtrated, then impure oil chamber can be replaced by dust bag, whose working concept is the same as for liquid. The exterior of the filtration core frame is situated with revolving metal wires that are top and bottom repeatedly stacked. Between each metal wire piece is a gap that allows fluid to pass through. This not only increase the structural strength of the filtration core, but also allow the particles or impurities to remain inside the filtration core, and sink downward towards the impure oil chamber, which achieve a beneficial filtration result. The spinning speed of the fluid inversion body and the power of the pump are related, and are also related to the materials of the fluid inversion body, upper baffle plate and hollow core shaft. The materials can be chosen to those suitable for spinning of the fluid inversion body. If a high spinning speed of the fluid inversion body is required, it may select to bear a heavy balanced block 5.

When the transport pump brings fuel to tangentially enter the pump from the fluid entry mouth 1, fluid will tangentially impact the blade and causes the blade to spin. This will cause the fluid inversion body inside the fluid inversion chamber 2 to spin in a single direction. At that moment, fuel will enter the right filtration core 7 through the right side directional pores 3 on the upper baffle plate 4 and filtrate. After parts of the fuel will be provided for diesel engine combustion by exiting at the oil connection mouth 16, the remaining fuel will directly enter the left filtration core 8 and backwash the filtration web of the left filtration core 8. The fuel that enters the left filtration core 8 will then enter into the fluid inversion chamber 2 through the left directional pores 25. At that moment, fuel will impact the blade 11 in a consistent direction and pass to the transport pump from the return oil connection mouth 15 through the pores 14 of the hollow core shaft 13, which will then combine with the fuel that come out of the oil box. The fuels will then be pumped into the connection mouth 1 through the transport pump and be recycled as such.

The invention claimed is:

1. A reflux backwashing mechanism for automatic fluid filtration, comprises an upper housing (17) and a lower housing (18) that are installed together; wherein the upper housing comprises a fluid entry mouth (1), a back flow exit mouth (15); the interior of the upper housing (17) and lower housing (18) contains an upper baffle plate (4); the upper baffle plate contains directional pores (3, 25) which are connected to the interior of the upper and lower housing; the interior of the upper housing (17) contains a fluid inversion chamber (2) whose interior contains a rotatable blade (11) and baffle plate (10); the interior of the lower housing (18) contains at least two filtration cores (7, 8); the upper opening of the filtration core and the pores of the upper baffle plate (4) correspond; the interior of the lower housing contains a lower baffle plate (6); impure oil pores (19) are located on top of the lower baffle plate (6); the impure oil pores (19) and the lower opening of the filtration core correspond, wherein the interior of the fluid inversion chamber (2) contains a hollow core shaft sleeve (12), the blade (11) and the baffle plate (10) are connected to the hollow core shaft sleeve (12); the hollow core shaft sleeve (12) contains an opening situated at the bottom of the baffle plate; the interior of the hollow core shaft sleeve (12) contains an upward opening hollow core shaft (13); the shaft wall of the hollow core shaft (13) are distributed with pores (14); the hollow core shaft (13) is installed on top of the upper baffle plate (4); wherein the directional pores of the upper baffle plate (4) contain two sections and are inter-connected; the upper section pores of the baffle plate is slant positioned relative to the lower section pores, whose slanted direction and the fluid flow direction in the fluid inversion chamber are basically the same.

2. The reflux backwashing mechanism for automatic fluid filtration of claim 1, wherein a heavy balanced block (5) is mounted on the hollow shaft sleeve (12), and the heavy balanced block is installed on the hollow core shaft (13).

3. The reflux backwashing mechanism for automatic fluid filtration of claim 1, wherein exterior of the filtration core frame (7, 8) contains revolving metal wires that are top to bottom overlapped; each of the metal wires contains a gap that allows fluid to pass through.

4. The reflux backwashing mechanism for automatic fluid filtration of claim 1, wherein the fluid entry mouth is tangentially positioned in the interior wall of the housing.

5. The reflux backwashing mechanism for automatic fluid filtration of claim 2, wherein the exterior of the filtration core frame contains revolving metal wires that are top and bottom overlapped, between each metal wires lies a gap that allows fluid to pass through.

6. The reflux backwashing mechanism for automatic fluid filtration of claim 2, wherein the fluid entry mouth (1) is tangentially positioned in the interior wall of the housing.

7. The reflux backwashing mechanism for automatic fluid filtration of claim 2, wherein the fluid entry mouth (1) is tangentially positioned in the interior wall of the housing.

\* \* \* \* \*